US012687135B1

(12) United States Patent
Dolfi-Hedenschau

(10) Patent No.: US 12,687,135 B1
(45) Date of Patent: Jul. 21, 2026

(54) INTAKE OVER INTAKE ENGINE

(71) Applicant: Taylor L.O. Dolfi-Hedenschau, Pahoa, HI (US)

(72) Inventor: Taylor L.O. Dolfi-Hedenschau, Pahoa, HI (US)

(73) Assignee: Taylor L.O. Dolfi-Hedenschau, Pahoa, HI (US)

( * ) Notice: Subject to any disclaimer, the term of this patent is extended or adjusted under 35 U.S.C. 154(b) by 0 days.

(21) Appl. No.: 19/295,675

(22) Filed: Aug. 10, 2025

(51) Int. Cl.

| | |
|---|---|
| ***F02F 7/00*** | (2006.01) |
| ***F01L 1/047*** | (2006.01) |
| ***F01L 1/44*** | (2006.01) |
| ***F02B 25/04*** | (2006.01) |
| ***F02F 1/42*** | (2006.01) |
| ***F02M 35/104*** | (2006.01) |

(52) U.S. Cl.

CPC ............ *F02F 7/0065* (2013.01); *F01L 1/047* (2013.01); *F01L 1/44* (2013.01); *F02B 25/04* (2013.01); *F02F 1/4285* (2013.01); *F02F 7/0043* (2013.01); *F02F 7/006* (2013.01); *F02M 35/104* (2013.01); *F01L 2001/054* (2013.01); *F02B 2275/00* (2013.01)

(58) Field of Classification Search

CPC .. F02F 1/002; F02F 1/4285; F02F 1/22; F02F 7/0043; F02F 7/006; F02F 7/0065; F01L 1/0047; F01L 2001/054; F01L 1/44; F02M 35/104; F02B 2275/00; F02B 25/04; F02B 25/06; F02B 29/083; F02B 29/086; F02B 33/30; F02B 2700/021; F02B 2700/023; F02B 2700/031; F02B 2700/034; F02B 2700/037; F02B 2710/021; F02B 2710/023; F02B 2710/032; F02B 2710/034; F02B 2710/036

See application file for complete search history.

(56) References Cited

U.S. PATENT DOCUMENTS

| | | | | | |
|---|---|---|---|---|---|
| 1,097,947 | A * | 5/1914 | Shaw | F02F 1/22 | 123/41.78 |
| 1,521,440 | A * | 12/1924 | Foster | F01L 1/12 | 123/90.22 |
| 2,698,611 | A * | 1/1955 | Knudsen | F01L 1/44 | 123/90.16 |
| 4,606,304 | A * | 8/1986 | Kruger | F02F 1/002 | 123/90.34 |
| 2018/0283264 | A1* | 10/2018 | Dalmas | F02F 3/28 | |

* cited by examiner

*Primary Examiner* — Loren C Edwards

(57) ABSTRACT

An improved internal combustion engine with selectively actuatable valves in the engine block. When actuated, these engine block valves allow more air (or an aerosolized mixture of fuel and air) to flow into the combustion chamber than would be available using only valves in the cylinder head. These engine block valves can be selectively actuated independently of each other and independent of valves in the cylinder head, by selectively controlling oil pressure in valve lifters that are operably connected to the engine block valves.

8 Claims, 6 Drawing Sheets

INTAKE OVER INTAKE ENGINE

TECHNICAL FIELD

This invention relates to improvements in internal combustion engines. Specifically, this invention relates to improvements in valves and timing of operation of valves in an internal combustion engine, to optimize flow of fuel and fluid over a wide range of engine speeds.

BACKGROUND ART

Internal combustion engines are engines that convert the chemical energy of a combusting fluid into kinetic energy of movement. One conventional type of internal combustion engine is a reciprocating internal combustion engine, which has a principal structural component, commonly called an engine block, having at least one cylindrical bore (hereinafter called a "cylinder") formed therein, having a head end and a driveshaft end, with a cylindrically shaped piston sealingly slidably movable inside to reciprocate between an inner position and an outer position. A cylinder head having at least one intake port and at least one exhaust port is sealingly attached over the head end of the cylinder, whereby the walls of the hollow cylinder, a crown surface of the piston, and the cylinder head form an expandable combustion chamber. Intake and exhaust valves, normally biased to be closed, and normally placed in the cylinder head in contemporary engine designs, are in fluid communication with the combustion chamber. When not necessary to refer specifically to a port, the term "valve" means both the port and the valve that closes the port, because the term "valve" implies a port that the valve opens and closes.

A drive shaft is drivably attached to the piston so that reciprocation of the pistons drives rotation of the drive shaft. A cam shaft having a plurality of cams with projecting lobes is drivably attached to the drive shaft, preferably by a timing belt, timing gear, or timing chain, driven by the drive shaft, and operably engageable with the valves, sometimes by valve lifters interposed between the cams and the valves, so that rotation of the drive shaft drives rotation of the cam shaft, which drives rotation of the cams and causes any valve lifters to lift the valves, or causes direct lifting of the valves, and thereby coordinates opening and closing of the intake valves and exhaust valves with reciprocation of the piston. The profiles of the lobes of the cams control the duration and extent of the opening and closing of the valves.

Conventionally, the valves are mushroom shaped valves, often called poppet valves, having a shaft, often referred to as the stem, with a cap end and a stem end. An enlarged portion shaped like a mushroom cap is attached at the cap end, and a valve lifter, if one is used, abuts against the stem end. The edges of the caps seal against the edges of the ports, and the valves are biased by springs in the closed position, and the valves are driven to open by the rotation of cams on the cam shaft, causing the projecting lobes of the cams to press against the valve stems (or the valve lifters, if present) to open the valves each rotation.

In a conventional four stroke engine, in an induction stroke, known as the first stroke, the piston moves to a lower position, which expands the combustion chamber, the intake valves are opened, and liquid fuel (usually gasoline, kerosene, or some other hydrocarbon or mix of hydrocarbons) and a gaseous oxidizer or reactant (usually air) are introduced into, and mixed in, the combustion chamber. Combustibility of the fuel depends on how well the fuel is mixed with air, so often fuel is mixed with air to form an aerosol with small droplets suspended in the air, and that aerosolized mixture is inlet into the cylinder, but liquid fuel (without prior aerosolizaton) can also be injected directly into the cylinder, such as by spraying, to be mixed with air in the cylinder. For simplicity, and to avoid confusion by the fact that "gas" in American English can refer to either gaseous matter or to gasoline, the gaseous oxidizer or reactant will be referred to as "air" but as used herein, the term "air" encompasses any other oxidizer or reactant that reacts with fuel to create a combustible mixture.

In a compression stroke, known as the second stroke, the piston moves to an upper position, which compresses the combustion chamber, which therefore compresses the fuel and air mixture.

In a power stroke, known as the third stroke, the fuel and air mixture is ignited, either by spark plugs or compression, so that the mixture explodes inside the combustion chamber to form exhaust gas, which drives the piston to the lower position.

In an exhaust stroke, known as the fourth stroke, the piston moves upward and the exhaust valves are opened to allow the exhaust gas to be removed from the combustion chamber, and the entire process then repeats from the first stroke.

Because the power of an internal combustion engine is driven by the power of the explosion in the combustion chamber, and because the power of the explosion depends on the power released by the fuel and air mixture when it explodes, for any particular fuel and air mixture, a limiting factor in the power of an internal combustion engine is the speed and duration of fluid flow through the valves (either the air and fuel through the intake valves, or the exhaust gases through the exhaust valves), which is affected by many factors, including the extent and duration of lifting of the valves, the diameters of the ports, the pressures of the fuel flows and the air flows, the swirl pattern of the mixture of aerosolized fuel and air (if an aerosolized fuel and air mixture is inletted through an intake port, known as "port injection") or of the air (if fuel is directly injected, known as "direct injection") (which determines how well the fuel and air are mixed when the fuel and air mixture is ignited), and other factors. It is noted that inletting air (or an aerosolized mixture of fuel and air) into a cylinder from two adjacent intake valves in the cylinder head does not create a substantial swirling effect because the flows of inletted air (or aerosolized mixture) from the two adjacent intake valves are parallel to each other.

Ideally, internal combustion engines operate over a wide range of frequencies, i.e., revolutions per minute, or RPMs. However, different fuel and air mixtures and therefore different valve timings would be desirable to meet different power requirements for different intended usages of the engine, because most engines do not have variable valve timings, so a compromise valve timing (usually using a single fixed cam profile) must be chosen, resulting in a "power band" for the engine that is usually less than the full operating range. Thus, another limiting factor on the power of an internal combustion engine is the timing and extent of the opening and closing of the valves at the various frequencies within the engine's operating range of frequencies—how high the valves are lifted (called "lift"), and for how long (called "duration"), during each cycle, at that particular frequency.

Increasing the number of valves in the head of a cylinder has been tried, but diminishing returns are reached after the number of valves in the head of each cylinder exceeds four. The amount of air (or an aerosolized fuel air mixture) inlet into the combustion chamber of a four stroke internal combustion engine through the intake ports is limited by the air flow around the circumference of the valve openings, at least where poppet valves (or other valves that partially block the centers of the ports) are used. As each additional valve is added to the cylinder head, all of the existing valves must be reduced in size (and therefore circumference) in order to make enough space for the additional valve, but beyond four valves, adding valves does not increase the aggregate circumference of all the valves (and therefore the aggregate air flow through all the valves) sufficiently to justify the additional complexity and expense.

In order to pass emissions requirements, most modern automobiles use overhead cam engine designs, in which multiple cylinders are arranged in one or two rows, with valves (and cams driving the valves) above each cylinder. However, various other arrangements of cylinders are known, including radial arrangements.

For better performance at higher frequencies (higher lift and longer duration), valves are often placed so close to the pistons that the valves can come into contact with the piston if the timing of the valves is not synchronized properly (such as if the timing belt breaks), leading to valve damage and expensive repairs. This is called interference.

Although two stroke internal combustion engines have an intake port in the engine block that allows air (or an aerosolized mixture of air and fuel and sometimes oil) to be taken into the combustion chamber, opening and closing of the intake port of a two stroke engine is not controlled indirectly by a separate valve mechanism, but instead is controlled directly by movement of the piston, with the piston directly blocking and directly unblocking the intake port in the engine block as the piston moves. Specifically, the down stroke moves the piston down past the intake port to open the intake port and allow air (or an aerosolized mixture of air and fuel and sometimes oil) to flow into the combustion chamber, and the up stroke moves the piston up past the intake port to block the intake port. A reed switch must be provided to prevent backflow of the air (or aerosolized mixture) during the down stroke. The exhaust port of a two stroke combustion engine is also opened and closed directly by movement of the piston. Thus, for a two stroke engine, the intake port in the engine block must be blocked and unblocked by movement of the piston. In sharp contrast, in a four stroke engine the valves are opened and closed indirectly, by an indirect valve mechanism, such as poppet valves opened by cams on a cam shaft that is driven by the drive shaft.

The Wikipedia article posted at https://en.m.wikipedia.org/wiki/Flathead engine, incorporated herein by reference, discloses that a flathead engine is an internal combustion engine with its poppet valves located in the engine block.

The Wikipedia article posted at https://en.m.wikipedia.org/wiki/IOE engine, incorporated herein by reference, discloses an engine with an inlet valve in the cylinder head, and an exhaust valve in the engine block.

The Wikipedia article posted at https://en.wikipedia.org/wiki/VTEC discloses an electronically controlled, oil pressure actuated, multiple cam profile Variable Valve Timing & Electronic Lift (VTEC) system.

U.S. Pat. No. 9,074,520 to Bandyopadhyay, incorporated herein by reference, discloses a cylinder liner with a plurality of circumferentially spaced intake ports.

U.S. Pat. No. 4,068,629 to Hooper, incorporated herein by reference, discloses a stepped piston two cycle engine, in which each cylinder also has auxiliary intake ports.

U.S. Pat. No. 4,144,850 to Asaka, et al., incorporated herein by reference, discloses auxiliary intake passages for internal combustion engines.

U.S. Pat. No. 9,551,220 to Fuqua, et al., incorporated herein by reference, discloses intake ports in an intake chamber which is inside a cylinder block.

US patent publication 20030192493 to Tsuneyoshi, et al, incorporated herein by reference, discloses an engine with an annular auxiliary combustion chamber with injection passages for injecting air within the auxiliary chamber into the combustion chamber.

U.S. Pat. No. 10,830,128 to Roland, incorporated herein by reference, discloses an engine with a fuel/air transfer cylinder in the engine block to inject fuel/air mixture into the combustion cylinder.

U.S. Pat. No. 11,773,765 to Bunjes, incorporated herein by reference, discloses air inlet valves in the cylinder head, and says additionally some of the air and/or fuel may be injected along a generally perpendicular direction relative to the movement of the piston and a “swirl effect” from multiple valves directing air in different directions.

U.S. Pat. No. 1,996,919 to Harris, incorporated herein by reference, discloses a gas swirl within the engine cylinder.

U.S. Pat. No. 9,038,608 to Winge, et al., incorporated herein by reference, discloses cam profile switching.

U.S. Pat. No. 8,833,058 to Ervin, et al., incorporated herein by reference, discloses switching between multiple cam profiles as well.

U.S. Pat. No. 10,012,185 to Sellnau, incorporated herein by reference, discloses cam phasers to provide further control over lift and/or duration of valves beyond that provided by a camshaft profile.

U.S. Pat. No. 12,006,853 to Matsura, incorporated herein by reference, discloses a ventilation port in a cylinder block.

US patent publication 20230114247 to Browne, et al., incorporated herein by reference, discloses inlet ports to generate a tumbling motion of the fuel air mixture prior to ignition.

U.S. Pat. No. 11,572,848 to Culbreth, incorporated herein by reference, discloses swirling an air-fuel mixture in a combustion chamber.

US patent publication US20240209770 to Nork, incorporated herein by reference, discloses air guiding baffles for an intake port to create a swirling motion.

U.S. Pat. No. 1,996,919 to Harris, incorporated herein by reference, discloses graduated conduits to provide accelerated movement of intake gas.

Great Britain patent 2425570 B2 to Turner, incorporated herein by reference, discloses an engine with poppet valves that are engageable with valve seats that span the cylinder block portion.

U.S. Pat. No. 9,879,634 to Paolo, et al., incorporated herein by reference, discloses an engine block with a cylinder coolant channel.

U.S. Pat. No. 547,989 to Iwasa, et al., incorporated herein by reference, discloses an engine with intake ports that generate a single strong swirl.

The publication posted at https://www.enginebuildermag.com/2020/11/cylinder-head-porting-turning-air-into-power/, incorporated herein by reference, discloses improvements to airflow quality and quantity from porting in the bowl area between the valve seat and valve guide.

Accordingly, it is an object of the present invention to provide an improved internal combustion engine with greater power over a greater range of frequencies.

It is a further object of the present invention to provide such an engine with greater individualized control over the speed and amount of fuel and air entering the combustion chamber of each cylinder, and the mixing of the fuel and air in the combustion chamber prior to ignition, as the RPM of the engine varies.

DISCLOSURE OF INVENTION

The above and other objects are achieved by an improved engine comprising an engine block having a hollow cylinder with cylinder walls, a head end and a driveshaft end, and also having a block intake port in fluid communication with the cylinder and a block exhaust port in fluid communication with the cylinder. A cylindrically shaped piston having a crown surface is sealingly slidably movable in the cylinder to reciprocate between an expansion position and a compression position. The piston does not block the block intake port when reciprocating between the expansion position and the compression position. A cylinder head having a head intake port and a head exhaust port is sealingly attached over the head end of the cylinder, so that the head intake port and the head exhaust port are in fluid communication with the cylinder, so that the cylinder walls, the crown surface of the piston, and the cylinder head form an expandable and compressible combustion chamber. A head intake valve is sealably engaged with the head intake port, a head exhaust valve is sealably engaged with the head exhaust port, a block intake valve is sealably engaged with the block intake port, and a block exhaust valve is sealably engaged with the block exhaust port. A drive shaft is drivably attached to the piston so that reciprocation of the piston drives rotation of the drive shaft. A block cam shaft having a first block cam with a projecting first block lobe forming a first block cam profile is drivably attached to the drive shaft and operably engageable with the block intake valve, so that rotation of the drive shaft drives rotation of the block cam shaft, which drives rotation of the first block cam, which coordinates opening and closing of the block intake valve with reciprocation of the piston according to the first block cam profile. In this manner, the block intake valve allows more air to be inletted into the combustion chamber than the head intake valve alone. Preferably, the first block cam can be selected independently of the head intake valve.

An alternative preferred embodiment of the invention further comprises such an engine with a valve lifter interposed between the first block cam and the block intake valve, in which the valve lifter comprises a preferably cylindrical hollow body with a sealed telescoping top to form a sealed valve lifter chamber, a spring in the valve lifter chamber biasing the telescoping top away from the cylindrical hollow body, and a pressure control solenoid in fluid communication with the valve lifter and an oil pump for the engine, so that if there is oil pressure inside the valve lifter chamber, then the oil pressure prevents the valve lifter from compressing, wherein the block intake valve will open when driven by the first block cam, but if there is no oil pressure inside the valve lifter chamber, then the valve lifter will compress, so that the valve lifter will not cause the block intake valve to open.

In another alternative preferred embodiment of the invention, the block intake port is configured to inlet air into the combustion chamber at an angle from air inletted into the combustion chamber through the head intake port.

In still another alternative preferred embodiment, the invention is an engine with an engine block having a hollow cylinder with cylinder walls, a head end and a driveshaft end, and also having a first block intake port in fluid communication with the cylinder and a first block exhaust port in fluid communication with the cylinder, and also having a second block intake port in fluid communication with the cylinder, and a second block exhaust port in fluid communication with the cylinder. A cylindrically shaped piston having a crown surface is sealingly slidably movable in the cylinder to reciprocate between an expansion position and a compression position. The piston does not block the block intake port when reciprocating between the expansion position and the compression position. A cylinder head having a head intake port and a head exhaust port is sealingly attached over the head end of the cylinder, so that the head intake port and the head exhaust port are in fluid communication with the cylinder, and so that the cylinder walls, the crown surface of the piston, and the cylinder head form an expandable and compressible combustion chamber. A head intake valve is sealably engaged with the head intake port, a head exhaust valve is sealably engaged with the head exhaust port, a first block intake valve is sealably engaged with the first block intake port, a first block exhaust valve is sealably engaged with the first block exhaust port, a second block intake valve is sealably engaged with the second block intake port, and a second block exhaust valve is sealably engaged with the second block exhaust port. A drive shaft is drivably attached to the piston so that reciprocation of the piston drives rotation of the drive shaft, and a block cam shaft is drivably attached to the drive shaft. A first block cam with a projecting first block lobe forming a first block cam profile is mounted on the block cam shaft, operably and selectably engageable with the first block intake valve, and a second block cam with a projecting second block lobe forming a second block cam profile is mounted on the block cam shaft, operably and selectably engageable with the second block intake valve. Rotation of the drive shaft drives rotation of the block cam shaft, which drives rotation of the first block cam, which when selected coordinates opening and closing of the first block intake valve with reciprocation of the piston according to the first block cam profile, and also drives rotation of the second block cam, which when selected coordinates opening and closing of the second block intake valve with reciprocation of the piston according to the second block cam profile.

In this manner, selecting either of the first block intake valve or the second block intake valve allows more air to be inletted into the combustion chamber than the head intake valve alone, and the first block cam and the second block cam can be selected independently of the head intake valve and independently of each other. Preferably, the first block cam profile is optimized for a first portion of an operating range of the engine, and the second block cam profile is optimized for a second portion of the operating range of the engine.

In still another alternative embodiment, the invention comprises an engine comprises an engine block having a hollow cylinder with cylinder walls, a head end and a driveshaft end, and also having a first block intake port in fluid communication with the cylinder and a first block exhaust port in fluid communication with the cylinder, a second block intake port in fluid communication with the cylinder, and a second block exhaust port in fluid communication with the cylinder, and a third block intake port in fluid communication with the cylinder, and a third block exhaust port in fluid communication with the cylinder. A cylindrically shaped piston having a crown surface is sealingly slidably movable in the cylinder to reciprocate between an expansion position and a compression position, so that the piston does not block the block intake port when reciprocating between the expansion position and the compression position. A cylinder head having a head intake port and a head exhaust port is sealingly attached over the head end of the cylinder, so that the head intake port and the head exhaust port are in fluid communication with the cylinder. In this manner, the cylinder walls, the crown surface of the piston, and the cylinder head form an expandable and compressible first combustion chamber. A head intake valve is sealably engaged with the head intake port, a head exhaust valve is sealably engaged with the head exhaust port, a first block intake valve is sealably engaged with the first block intake port, a first block exhaust valve is sealably engaged with the first block exhaust port, a second block intake valve is sealably engaged with the second block intake port, a second block exhaust valve is sealably engaged with the second block exhaust port, a third block intake valve is sealably engaged with the third block intake port, and a third block exhaust valve is sealably engaged with the third block exhaust port. A drive shaft is drivably attached to the piston so that reciprocation of the piston drives rotation of the drive shaft. A block cam shaft is drivably attached to the drive shaft. A first block cam with a projecting first block lobe forming a first block cam profile is mounted on the block cam shaft, operably and selectably engageable with the first block intake valve; a second block cam with a projecting second block lobe forming a second block cam profile is mounted on the block cam shaft, operably and selectably engageable with the second block intake valve; and a third block cam with a projecting third block lobe forming a third block cam profile is mounted on the block cam shaft, operably and selectably engageable with the third block intake valve.

In this manner, rotation of the drive shaft drives rotation of the block cam shaft, which drives rotation of the first block cam, which when selected coordinates opening and closing of the first block intake valve with reciprocation of the piston according to the first block cam profile, and also drives rotation of the second block cam, which when selected coordinates opening and closing of the second block intake valve with reciprocation of the piston according to the second block cam profile, and also drives rotation of the third block cam, which when selected coordinates opening and closing of the third block intake valve with reciprocation of the piston according to the third block cam profile. In this manner, selecting any of the first block intake valve, the second block intake valve, or the third block intake valve allows more air to be inletted into the combustion chamber than the head intake valve alone, and the first block cam, the second block cam, and the third block cam can be selected independently of the head intake valve and independently of each other.

In another alternative embodiment, the first block cam profile is optimized for a first portion of an operating range of the engine, the second block cam profile is optimized for a second portion of the operating range of the engine, and the third block cam profile is optimized for a third portion of the operating range of the engine.

In still another alternative embodiment, the engine has an intake manifold with a head intake pipe connected to the head intake port and a block intake pipe connected to the block intake port. The head intake pipe has a head intake pipe cross sectional area and a head intake pipe length through which air is inletted into the head intake port, and the block intake pipe has a block intake pipe cross sectional area and a block intake pipe length through which air is inletted into the block intake port. The head intake pipe cross sectional area and the head intake pipe length are preferably selected to optimize speed and volume of air through the head intake port in a first portion of an operating range of the engine; and the block intake pipe cross sectional area and the block intake pipe length are preferably selected to optimize speed and volume of air through the block intake port in a second portion of the operating range of the engine.

BEST MODES FOR CARRYING OUT INVENTION

Figure 1:
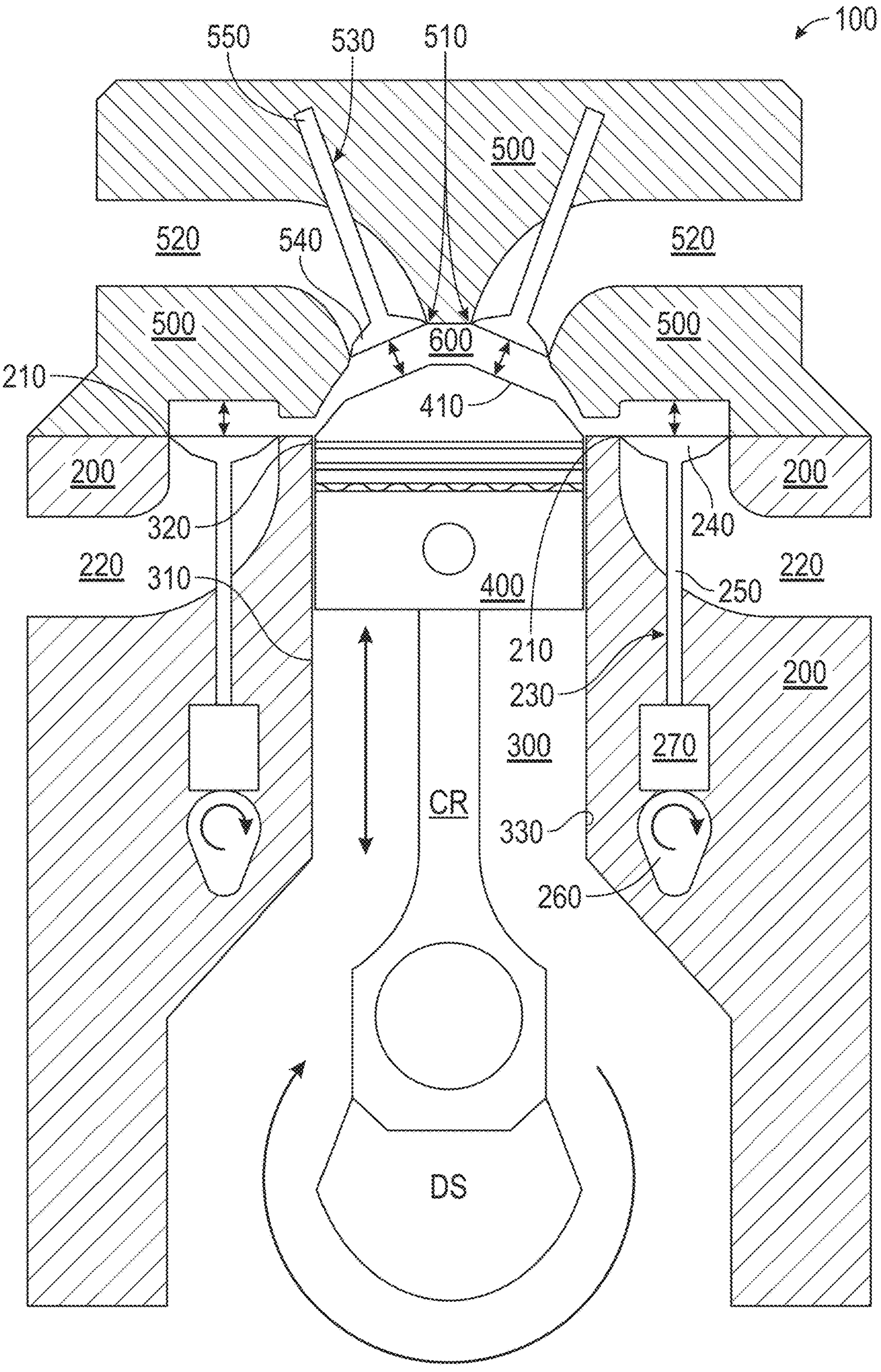
FIG. 1 is an elevational schematic view of an engine according to a presently preferred embodiment of the present invention.

Referring to FIG. 1, shown is an elevational schematic view of a presently preferred embodiment of the present invention 100, in which an engine block 200 has a hollow cylinder 300 formed therein, having cylinder walls 310, a head end 320 and a driveshaft end 330.

As is conventional, a piston 400 having a crown surface 410 is sealingly slidably movable within the cylinder 300 to reciprocate between a compression position with the crown surface 410 near the head end 320 of the cylinder 300, and an expansion position with the crown surface 410 distal from the head end 320 of the cylinder 300, and preferably near the driveshaft end 330 of the cylinder 300.

A cylinder head 500 having cylinder head ports 510 in fluid communication with cylinder head passages 520 is sealingly mounted over the head end 320 of the cylinder 300. The cylinder walls 310, crown surface 410, and the cylinder head 500 form an expandable and compressible combustion chamber 600, with the cylinder head ports 510 leading to the combustion chamber 600. A connecting rod CR is connected to the piston 400 and drives a drive shaft DS, so that reciprocation of the piston 400 drives rotation of the drive shaft DS.

Figure 7:
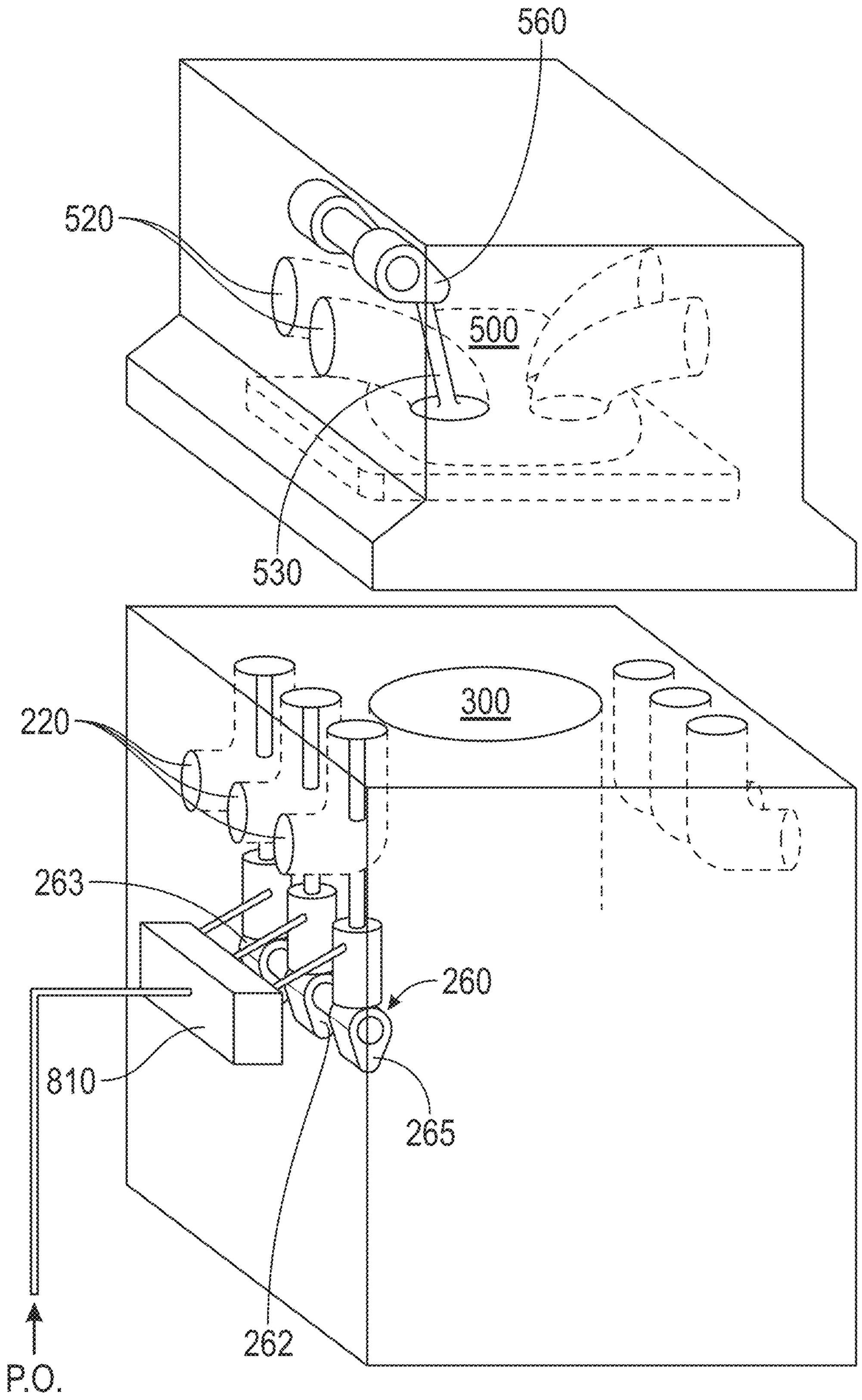
FIG. 7 is a perspective schematic view of the embodiment of FIG. 5, in an exploded view that also shows the cylinder head with four valves, with the engine block omitted for clarity.

Cylinder head valves 530 having cylinder head valve caps 540 and cylinder head valve stems 550 are mounted in the cylinder head 500 to reciprocate and thereby controllably open and close the cylinder head ports 510, preferably using cams that are drivable connected to a cam shaft, and optionally using valve lifters (see FIG. 7). Valve springs connected to the cylinder head valves 530 preferably bias the cylinder head valve caps 540 in the closed position to seal against the cylinder head ports 510 (sometimes called the valve seat), and the cams lift the cylinder head valve caps 540 away from the cylinder head ports 510 to open the cylinder head valves 530.

For simplicity of understanding of operating principles, only a single pair of head valves for the cylinder head 500 is shown, even though it is conventional for engines to have two pairs of valves in the cylinder head: two intake valves and two exhaust valves. Which valves are used as intake valves and which valves are used as exhaust valves can be selected based on desired performance criteria. In some configurations, both valves on one side are used as intake valves, and both valves on the other side are used as exhaust valves. In other configurations, valves diagonally opposite each other in one direction are used as intake valves, and valves diagonally opposite each other in the other direction are used as exhaust valves.

The engine block 200 also has block ports 210 leading to the cylinder 300, in fluid communication with engine block passages 220 formed in the engine block 200. Block valves 230 having block caps 240 and block stems 250 are mounted in the engine block 200 to reciprocate and thereby controllably open and close the engine block ports 210, preferably using block valve first cams 260 having a first cam profile, and block valve lifters 270. Very differently from two stroke engines, the piston 400 does not block the block ports 210 when reciprocating between the expansion position and the compression position. Again, for simplicity of understanding of operating principles, only a single pair of block valves is shown, although additional block intake valves and additional block exhaust valves can also be provided, and may be preferable. Again, which valves are used as intake valves and which valves are used as exhaust valves can be selected based on desired performance criteria. In some configurations, valves on one side of the engine block are used as intake valves, and valves on the opposite side are used as exhaust valves. In other configurations, valves on opposite sides of the engine block can be used together as intake valves, with the remaining valves being used together as exhaust valves.

A block valve coordination mechanism, preferably block valve first cams 260 and block valve lifters 270, is operably connected to the block valves 230 to coordinate lifting of the block valves 230 and opening of the engine block ports 210.

Similarly, a cylinder head valve coordination mechanism, preferably similar to the block valve first cams 260 (optionally with valve lifters) is operably connected to the cylinder head valves 530 to coordinate lifting of the cylinder head valves 530 (see FIG. 7).

Preferably, one or more selected block valves 230 are used as air (or aerosolized fuel and air mixture) intake valves, and one or more selected block valves 230 are used as exhaust valves.

Preferably also, one or more selected cylinder head valves 530 are used as air (or aerosolized fuel and air mixture) intake valves, and one or more selected cylinder head valves 530 are usable as exhaust valves.

With this construction, the block intake valves 230, when actuated, allow more air to be inletted into the combustion chamber 600 than the cylinder head valves 530 would allow alone.

Preferably, the cylinder head valves selected as air (or aerosolized fuel and air mixture) intake valves and the engine block valves selected as air (or aerosolized fuel and air mixture) intake valves are selected, and the cylinder head valve coordination mechanism and the block valve coordination mechanism are configured, so that air (or aerosolized fuel and air mixture) inletted into the combustion chamber 600 by the cylinder head intake valves flow into air (or aerosolized fuel and air mixture) inletted into the combustion chamber 600 by the block intake valves to create a swirling pattern of air (or aerosolized fuel and air mixture) in the combustion chamber that increases efficiency of combustion of fuel and air in the combustion chamber.

Because the block valves are not in the cylinder head, they inherently avoid the problem of interference, which is common with higher performance cam profiles.

Figure 2:
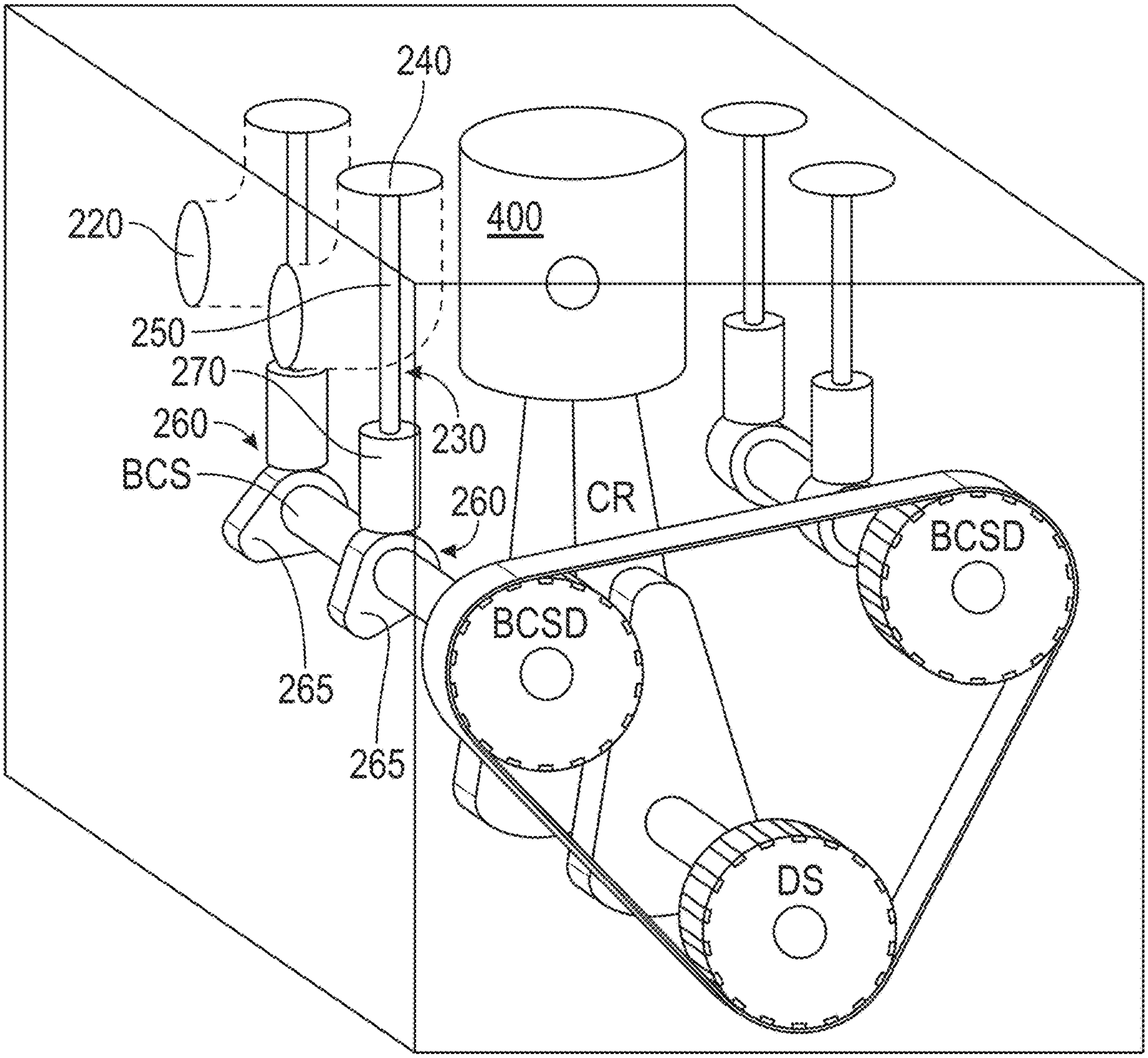
FIG. 2 is a perspective view of the piston, camshaft, valve lifters, valves, and engine block ports of the embodiment of FIG. 1, with the engine block omitted for clarity.

Referring to FIG. 2, shown is a perspective view of the piston, camshaft, valve lifters, valves, and engine block ports of the embodiment of FIG. 1, with the engine block omitted for clarity. As can be seen, the opening and closing of the engine block valves 230 is controlled by rotation of the first cams 260. As the first cams 260 rotate, the lobes 265 on the first cams 260 cause the valve lifters 270 to reciprocate, thus causing the block valve stems 250 and block caps 240 to reciprocate, and to open and close the block valves 210 (shown in FIG. 1). The first cams 260 are mounted on a block cam shaft BCS on which is mounted a block cam shaft driving wheel BCSD. A timing chain, timing belt, or other control mechanism (not shown) operably coordinates and drives the block cam shaft driving wheel BCSD with rotation of the drive shaft DS, so that as the piston 400 reciprocates and drives the drive shaft DS to rotate, the drive shaft DS rotates the block cam shaft driving wheel BCSD, which causes the block cam shaft BCS to rotate, thus driving the first cams 260 to rotate, and to cause the lobes 265 to drive the valve lifters 270 to reciprocate, and to open and close the block valves 230 in coordination with reciprocation of the piston 400.

Figure 3:
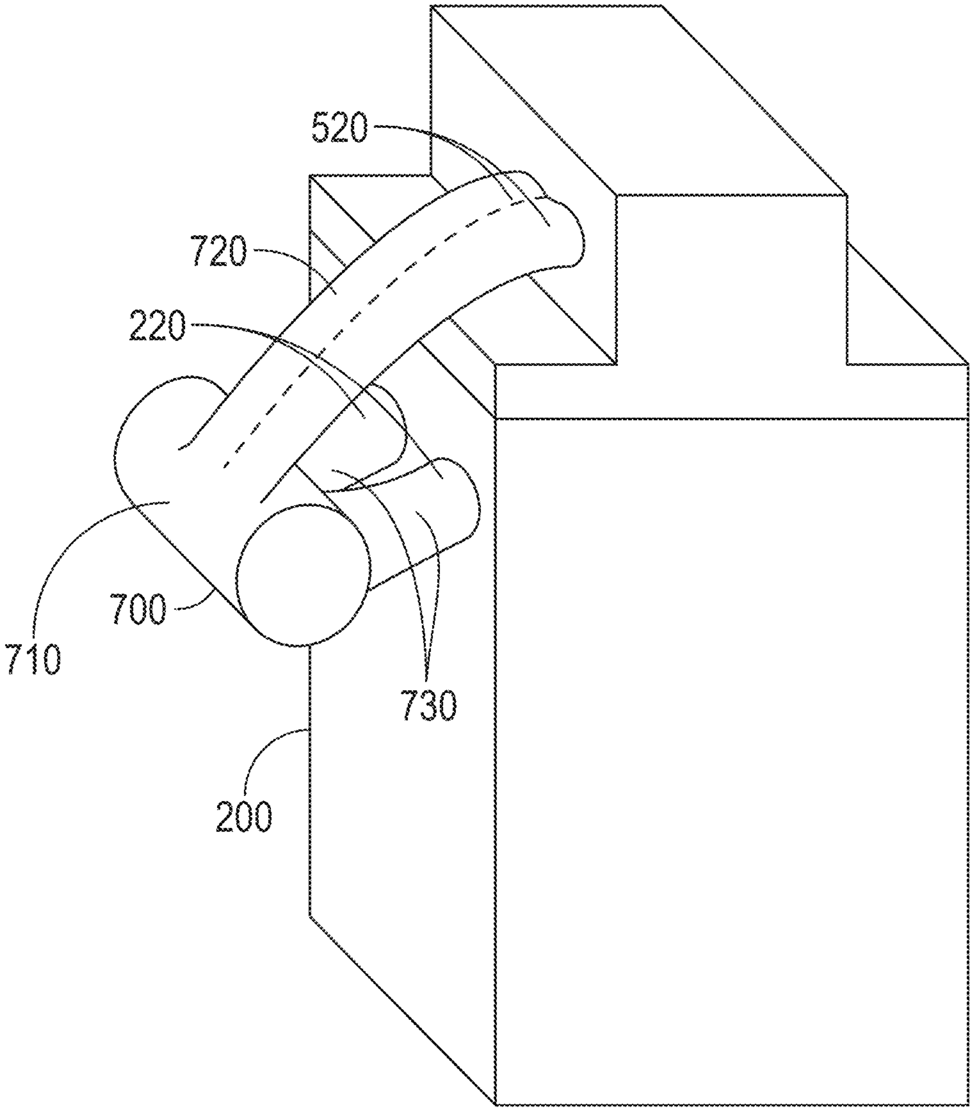
FIG. 3 is a perspective view of an air inlet manifold of an alternative embodiment of the present invention with cylinder head ports and cylinder block ports having air inletted from a single source.

Referring to FIG. 3, shown is a perspective view of the air inlet manifold of the preferred embodiment of FIG. 1. The velocity and volume of the flow of air through the engine block passages 220 and the cylinder head passages 520 affects the efficiency of combustion of the air fuel mixture in the combustion chamber 600. Thus, it may be advantageous to have the velocities and volumes of the flow of air flowing through the cylinder head passages 520 to be different from the velocities and volumes of air flowing through the engine block passages 220. This can be accomplished by having an air manifold 700 having a central portion 710 having cylinder head pipes 720 leading to the cylinder head passages 520 and engine block pipes 730 leading to the engine block passages 220, and to have the cylinder head pipes 720 and engine block pipes 730 have different lengths and cross sectional areas, which cross sectional areas could vary along the lengths of the cylinder head pipes 720 and engine block pipes 730. Because the air (or aerosolized air and fuel mixture) travel different pathways to the cylinder head ports 520 and the engine block ports 220, and because the cam profiles for the cylinder head ports 520 and the engine block ports 220 can differ (including possibly having multiple selectable cam profiles for the engine block ports 220), and because fuel can be normally aspirated or supercharged (above atmospheric pressure) and fuel can be introduced by carburetor or by fuel injection, as best for the specific port, it may be better for pathways to be longer and to have smaller diameter and resultant higher velocity at low engine speed to fill the cylinder with more air at lower speed, for example. Thus, the cylinder head ports 520 and the engine block ports 220 can be selected to optimize for multiple portions of the frequency range of operation of the engine.

The different path lengths of the manifold 700 and the possibly different valve lifts and durations from different cam profiles between the head valves and the block valves, also allow configuring to optimize swirl patterns of the fuel and air to optimize combustion at different portions of the operating range of the engine.

Figure 4:
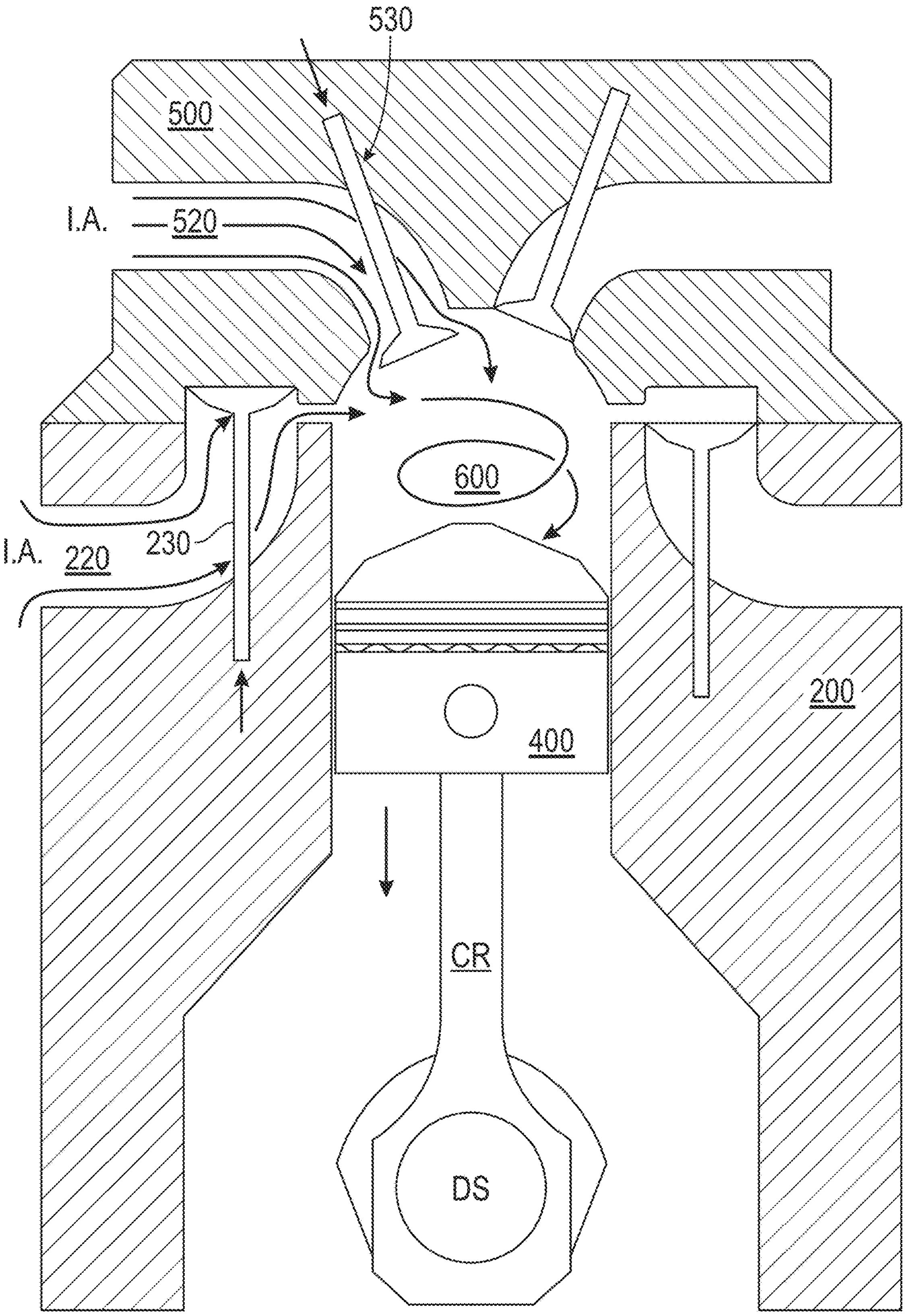
FIG. 4 is an elevational schematic view of the embodiment of FIG. 1, showing the cylinder head valve and engine block valve operating in coordination to generate a swirl pattern.

Referring to FIG. 4, shown is an elevational schematic view of the embodiment of FIG. 1, showing a cylinder head valve 530 and an engine block valve 230 operating in one coordinated manner to generate a swirl pattern. Specifically, the cylinder head valve 530 on the left side and the engine block valve 230 on the left side are both opened at the same time, so that air (or an aerosolized mixture of fuel and air) coming through the cylinder head passage 520 interacts with air (or an aerosolized mixture of fuel and air) coming through the engine block passage 220 in the combustion chamber 600 to form a swirling pattern.

Figure 5:
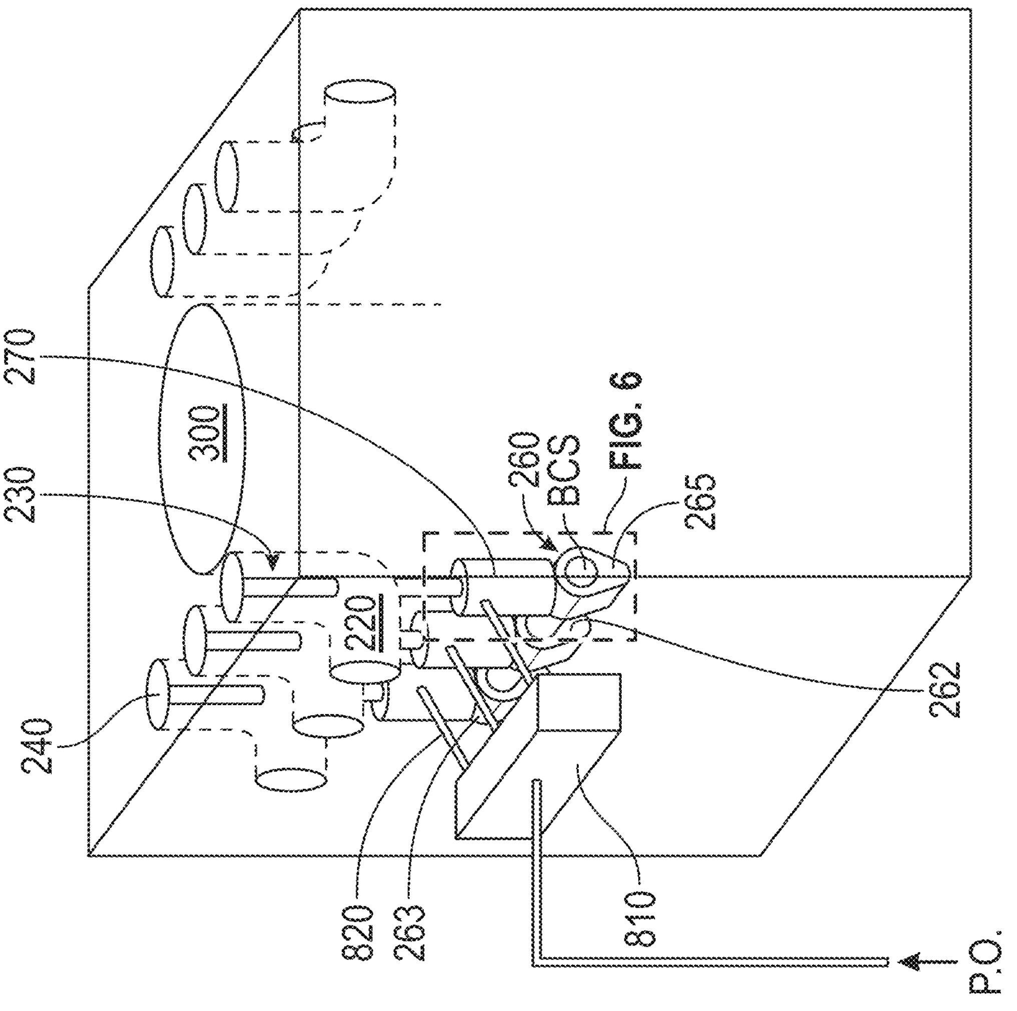
FIG. 5 is a perspective schematic view of an engine block with a cam shaft and valve lifters for an embodiment of the present invention with six engine block valves for a single cylinder, with the engine block omitted for clarity.

Referring to FIG. 5, shown is a perspective schematic view of an engine block with cam shaft and valve lifters for a presently preferred embodiment with six valves in the engine block for a single cylinder: three intake valves and three exhaust valves (which would be in addition to any valves in the cylinder head, which preferably would be four: two intake valves and two exhaust valves, providing ten valves total for the cylinder). As can be seen, rotation of the block cam shaft BCS drives rotation of the first cam 260, so that the lobe 265 of the first cam 260 causes a valve lifter 270 to reciprocate, thus causing a block valve 230 to reciprocate. Preferably, a pressure control solenoid 810 is in fluid communication with each of the valve lifters 270 via oil valve lines 820.

Preferably also, the pressure control solenoid 810 can control each of the oil valve lines 820 individually and in combination, so that the pressure control solenoid 810 allows selective activation of none, one, some, or all of the block valves, as desired for performance. The pressure control solenoid 810 is preferably provided with pressurized oil PO from the oil pump for the engine and is controlled by any known control mechanism, such as an electronic control unit or any other control mechanism known to the ordinary artisan. Of course, any other means for selectively activating none, one, some, or all of the block valves can be used, such as pneumatic, electronic, or mechanical apparatus that would be known by the ordinary artisan.

Optionally, at least one second cam with a second cam profile 262 can also be mounted on the block cam shaft BCS that rotates together with first cam 260. Preferably, the second cam profile can provide lift and duration of the input valve controlled by the second cam 262 that increases performance beyond performance provided only by first cam 261, thus broadening the power band for the engine.

Similarly, at least a third cam with a third cam profile 263 can also be mounted on the block cam shaft BCS that rotates together with first cam 260 and second cam 262. Preferably, the third cam profile can provide lift and duration of the input valve controlled by the third cam 263 that increases performance beyond performance provided only by first cam 262 and second cam 263, thus further broadening the power band for the engine. This can result in ten valves per cylinder: two intake valves and two exhaust valves in the cylinder head, and three intake valves and three exhaust valves in the engine block.

In FIG. 5, the engine block passages 220 on one side of the cylinder 300 preferably lead to engine block valves 230 used for intake of air (or aerosolized fuel and air mixture) into the cylinder 300, while the engine block passages on the other side of the cylinder 300 lead to engine block valves used for exhaust. Which engine block passages are used for intake and which engine block passages are used for exhaust can be varied based on desired performance.

For clarity, the cams, 260, 262, 263, valve lifters 270, pressure control solenoid 810 and associated parts are only shown for one side of the cylinder. Optionally, they can also be provided on the other side of the cylinder, as desired.

Figure 6:
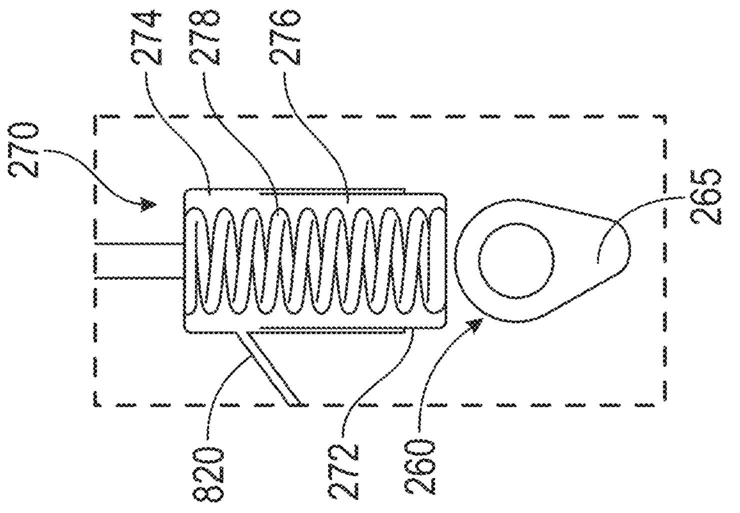
FIG. 6 is a closeup cutaway view of a valve lifter of FIG. 5.

Referring to FIG. 6, shown is a closeup cutaway view of a valve lifter of FIG. 5. Preferably, a valve lifter 270 has a cylindrical hollow body 272 with a sealed telescoping top 274 to form a hollow sealed valve lifter chamber 276, and there is a spring 278 in the valve lifter chamber 276 biasing the telescoping top 274 away from the cylindrical hollow body 272. In this manner, if there is oil pressure inside the valve lifter chamber 276, then the oil pressure prevents the valve lifter 270 from compressing, which will cause the block valve 230 to reciprocate, but if there is no oil pressure inside the valve lifter chamber 276, then the valve lifter 270 will compress, so that the valve lifter 270 will not cause the block valve 230 to reciprocate. Alternatively, the amount of oil pressure can control how much the valve lifter 270 compresses and therefore whether and how much the engine block valves 230 open and close. Thus, the valve lifter 270 allows selection of the cam with which it is in contact to cause reciprocation of the block valve 230.

Referring to FIG. 7, shown is a perspective schematic view of the embodiment of FIG. 5, in an exploded view also showing the cylinder head 500 with the conventional four cylinder head valves: two for intake and two for exhaust. As noted before, which valves are to be used as intake valves and which valves are to be used as exhaust valves can be varied based on performance. In FIG. 7, cylinder head passages 520 on the left side of the cylinder are used for intake of air (or an aerosolized air and fuel mixture), and the cylinder head passages on the right side are used for exhaust. Also shown are conventional overhead cams 560 opening cylinder head valves 530.

As explained with respect to FIG. 5, the engine block has engine block passages 220. In FIG. 7, the engine block passages 220 on the left side of the cylinder are used for intake of air (or an aerosolized air and fuel mixture), and the cylinder head passages on the right side are used for exhaust. Also shown are the first cam 260, second cam 262 and third cam 263, which were previously explained with respect to FIG. 5.

As in FIG. 5, for clarity, the cams 260, 262, 263, valve lifters, pressure control solenoid 810 and associated parts are only shown for one side of the cylinder. Optionally, they can also be provided on the other side of the cylinder, as desired.

The operation and advantages of the present invention can now be explained. For simplicity, this explanation will refer to valves, and not the specific structures of the valves and ports.

Contemporary four stroke internal combustion engines have four valves in the cylinder head, usually two for intake and two for exhaust. A limiting factor for power generated by a four stroke internal combustion engine is the amount of air (or an aerosolized mixture of fuel and air) that can be inlet into the combustion chamber each cycle. As explained above, there are diminishing returns for providing more valves in the cylinder head beyond four. The present invention provides for one or more valves in the engine block, which can be individually activated as desired, depending on desired performance. These additional engine block valves can be operated using the same timing as the conventional cylinder head valves, because the engine block valves are driven by cams mounted on a cam shaft that is driven by the drive shaft, just as the cylinder head valves are driven by cams mounted on a cam shaft that is driven by the same drive shaft. When desired performance requires, one or more of the engine block valves can be selected to be opened, to inlet additional air (or an aerosolized fuel and air mixture) into the cylinder to enhance performance of the engine, or to exhaust additional exhaust gasses. The performance benefits of this invention apply to both intake valves and exhaust valves, except that the swirling effect benefit only applies to intake valves.

Further, because the engine block valves are selectively individually activatable, each of the engine block valves can be driven by a cam with a different cam profile, providing individualized enhancements to performance of the engine, depending on the desired performance.

Thus, at its simplest, the invention is to add an additional intake valve to an engine that already has intake valves in the cylinder head, to increase the potential aggregate air flow capacity through the intake valves, preferably by adding at least one selectively actuatable intake valve to the engine block, to optionally selectively inlet additional air (or an aerosolized fuel and air mixture) into the cylinder.

Additionally, the invention allows even more control over selectively increasing the air (or aerosolized fuel and air mixture) that is inletted into the combustion chamber as desired performance may require, to broaden the power band of the engine, without changing the timing of the engine, by providing multiple additional engine block intake valves and then selectively actuating selected ones of those individual engine block intake valves, with the valves optionally having different cam profiles to provide different duration and lift of each valve.

While the present invention has been disclosed in connection with the presently preferred best mode described herein, it should be understood that the best mode includes words of description and illustration, rather than words of limitation. There may be other embodiments which fall within this spirit and scope of the invention as defined by the claims. For example, other mechanisms can be used for controlling the inletting of air (or an aerosolized fuel and air mixture) into the cylinder, such as electronically or pneumatically controlled valves, as known to the ordinary artisan. Accordingly, no limitations are to be implied or inferred in this invention except as specifically and as explicitly set forth in the claims.

INDUSTRIAL APPLICABILITY

The present invention is applicable whenever it is desired to provide an internal combustion engine with improved power over a wide range of operating conditions.

What is claimed is:

1. An engine, comprising:

an engine block having a hollow cylinder with cylinder walls, a head end and a driveshaft end, and also having a block intake port in fluid communication with said cylinder and a block exhaust port in fluid communication with said cylinder;

a cylindrically shaped piston having a crown surface sealingly slidably movable in said cylinder to reciprocate between an expansion position and a compression position, wherein said piston does not block said block intake port when reciprocating between said expansion position and said compression position;

a cylinder head having a head intake port and a head exhaust port, said cylinder head being sealingly attached over said head end of said cylinder, whereby said head intake port and said head exhaust port are in fluid communication with said cylinder, and whereby said cylinder walls, said crown surface of said piston, and said cylinder head form an expandable and compressible combustion chamber;

a head intake valve sealably engaged with said head intake port;

a head exhaust valve sealably engaged with said head exhaust port;

a block intake valve, sealably engaged with said block intake port;

a block exhaust valve, sealably engaged with said block exhaust port;

a drive shaft drivably attached to said piston so that the reciprocation of said piston drives rotation of said drive shaft;

a block cam shaft drivably attached to said drive shaft;

a first block cam with a projecting first block lobe forming a first block cam profile mounted on said block cam shaft, operably and selectably engageable with said first block intake valve;

whereby the rotation of said drive shaft drives rotation of said block cam shaft, which drives rotation of said first block cam, which coordinates opening and closing of said block intake valve with the reciprocation of said piston according to said first block cam profile to coordinate the opening and closing of said block intake valve with the reciprocation of said piston;

wherein said block intake valve allows more air to be inletted into said combustion chamber than said head intake valve alone.

2. The engine according to claim 1, further comprising:

a valve lifter interposed between said first block cam and said block intake valve, wherein said valve lifter comprises a hollow body with a sealed telescoping top to form a sealed valve lifter chamber, a spring in said valve lifter chamber biasing said telescoping top away from said hollow body; and a pressure control solenoid in fluid communication with said valve lifter and an oil pump for said engine;

whereby if there is oil pressure inside said valve lifter chamber, then said oil pressure prevents said valve lifter from compressing, wherein said block intake valve will open when driven by said first block cam, but if there is no oil pressure inside said valve lifter chamber, then said valve lifter will compress, so that said valve lifter will not cause said block intake valve to open.

3. The engine according to claim 1, wherein said block intake port is configured to inlet air into said combustion chamber at an angle from air inletted into said combustion chamber through said head intake port.

4. The engine according to claim 1, further comprising:

an intake manifold having a head intake pipe connected to said head intake port and a block intake pipe connected to said block intake port, wherein said head intake pipe has a head intake pipe cross sectional area and a head intake pipe length through which air is inletted into said head intake port, and wherein said block intake pipe has a block intake pipe cross sectional area and a block intake pipe length through which air is inletted into said block intake port;

wherein said head intake pipe cross sectional area and said head intake pipe length are selected to optimize speed and volume of air through said head intake port in a first portion of an operating range of said engine; and wherein said block intake pipe cross sectional area and said block intake pipe length are selected to optimize speed and volume of air through said block intake port in a second portion of said operating range of said engine.

5. An engine, comprising:

an engine block having a hollow cylinder with cylinder walls, a head end and a driveshaft end, and also having a first block intake port in fluid communication with said cylinder and a first block exhaust port in fluid communication with said cylinder, a second block intake port in fluid communication with said cylinder, and a second block exhaust port in fluid communication with said cylinder;

a cylindrically shaped piston having a crown surface sealingly slidably movable in said cylinder to reciprocate between an expansion position and a compression position, wherein said piston does not block any of said block intake ports when reciprocating between said expansion position and said compression position;

a cylinder head having a head intake port and a head exhaust port, said cylinder head being sealingly attached over said head end of said cylinder, whereby said head intake port and said head exhaust port are in fluid communication with said cylinder, and whereby said cylinder walls, said crown surface of said piston, and said cylinder head form an expandable and compressible combustion chamber;

a head intake valve, sealably engaged with said head intake port;

a head exhaust valve, sealably engaged with said head exhaust port;

a first block intake valve, sealably engaged with said first block intake port;

a first block exhaust valve, sealably engaged with said first block exhaust port;

a second block intake valve, sealably engaged with said second block intake port;

a second block exhaust valve, sealably engaged with said second block exhaust port;

a drive shaft drivably attached to said piston so that the reciprocation of said piston drives rotation of said drive shaft;

a block cam shaft drivably attached to said drive shaft;

a first block cam with a projecting first block lobe forming a first block cam profile mounted on said block cam shaft, operably and selectably engageable with said first block intake valve;

a second block cam with a projecting second block lobe forming a second block cam profile mounted on said block cam shaft, operably and selectably engageable with said second block intake valve, whereby the rotation of said drive shaft drives rotation of said block cam shaft, which drives rotation of said first block cam, which when selected coordinates opening and closing of said first block intake valve with the reciprocation of said piston according to said first block cam profile, and also drives rotation of said second block cam, which when selected coordinates opening and closing of said second block intake valve with the reciprocation of said piston according to said second block cam profile;

wherein selecting either of said first block cam or said second block cam allows more air to be inletted into said combustion chamber than said head intake valve alone;

wherein said first block cam and said second block cam can be selected independently of said head intake valve and independently of each other.

6. The engine according to claim 5, wherein said first block cam profile is optimized for a first portion of an operating range of said engine, and wherein said second block cam profile is optimized for a second portion of said operating range of said engine.

7. An engine, comprising:

an engine block having a hollow cylinder with cylinder walls, a head end and a driveshaft end, and also having a first block intake port in fluid communication with said cylinder and a first block exhaust port in fluid communication with said cylinder, a second block intake port in fluid communication with said cylinder, and a second block exhaust port in fluid communication with said cylinder, and a third block intake port in fluid communication with said cylinder, and a third block exhaust port in fluid communication with said cylinder;

a cylindrically shaped piston having a crown surface sealingly slidably movable in said cylinder to reciprocate between an expansion position and a compression position, wherein said piston does not block any of said block intake ports when reciprocating between said expansion position and said compression position;

a cylinder head having a head intake port and a head exhaust port, said cylinder head being sealingly attached over said head end of said cylinder, whereby said head intake port and said head exhaust port are in fluid communication with said cylinder, and whereby said cylinder walls, said crown surface of said piston, and said cylinder head form an expandable and compressible first combustion chamber;

a head intake valve, sealably engaged with said head intake port;

a head exhaust valve, sealably engaged with said head exhaust port;

a first block intake valve, sealably engaged with said first block intake port;

a first block exhaust valve, sealably engaged with said first block exhaust port;

a second block intake valve, sealably engaged with said second block intake port;

a second block exhaust valve, sealably engaged with said second block exhaust port;

a third block intake valve, sealably engaged with said third block intake port;

a third block exhaust valve, sealably engaged with said third block exhaust port;

a drive shaft drivably attached to said piston so that the reciprocation of said piston drives rotation of said drive shaft;

a block cam shaft drivably attached to said driveshaft;

a first block cam with a projecting first block lobe forming a first block cam profile mounted on said block cam shaft, operably and selectably engageable with said first block intake valve;

a second block cam with a projecting second block lobe forming a second block cam profile mounted on said block cam shaft, operably and selectably engageable with said second block intake valve;

a third block cam with a projecting third block lobe forming a third block cam profile mounted on said block cam shaft, operably and selectably engageable with said third block intake valve, whereby the rotation of said drive shaft drives rotation of said block cam shaft, which drives rotation of said first block cam, which when selected coordinates opening and closing of said first block intake valve with the reciprocation of said piston according to said first block cam profile, and also drives rotation of said second block cam, which when selected coordinates opening and closing of said second block intake valve with the reciprocation of said piston according to said second block cam profile, and also drives rotation of said third block cam, which when selected coordinates opening and closing of said third block intake valve with the reciprocation of said piston according to said third block cam profile; and wherein selecting any of said first block intake valve, said second block intake valve, or said third block intake valve allows more air to be inletted into said combustion chamber than said head intake valve alone, wherein said first block cam, said second block cam, and said third block cam can be selected independently of said head intake valve and independently of each other.

8. The engine according to claim 7, wherein said first block cam profile is optimized for a first portion of an operating range of said engine, wherein said second block cam profile is optimized for a second portion of said operating range of said engine, and wherein said third block cam profile is optimized for a third portion of said operating range of said engine.

* * * * *